United States Patent [19]
Broderick

[11] 3,947,208
[45] Mar. 30, 1976

[54] ARTICLE ENGAGING AND EXTRACTING ARRANGEMENT FOR THE REMOVAL OF MOLDED PIECES FROM A MOLDING MACHINE

[76] Inventor: Walter M. Broderick, 854 Wilbraham Road, Springfield, Mass. 01109

[22] Filed: Mar. 19, 1975

[21] Appl. No.: 559,722

[52] U.S. Cl. .......................................... 425/436 R
[51] Int. Cl.² .......................................... B29C 7/00
[58] Field of Search ......... 425/436 R, 436 RM, 444; 249/66

[56] References Cited
UNITED STATES PATENTS

| | | | |
|---|---|---|---|
| 3,081,486 | 3/1963 | Skvorc | 425/436 X |
| 3,193,874 | 7/1965 | Jablonski | 425/444 X |
| 3,702,749 | 11/1972 | Flusfeder et al. | 425/436 X |

*Primary Examiner*—J. Howard Flint, Jr.
*Attorney, Agent, or Firm*—Ross, Ross & Flavin

[57] ABSTRACT

An apparatus for engaging and extracting formed articles from an article forming machine is machine mounted adjacent the article forming area and includes a robot in the form of a pivotally connected arm suspended from the mounting and fingers at the free or head end of the arm operative in article engaging and article releasing motions by a cylinder on the fore part of the arm in synchronism with the article forming cycles of the machine. The formed articles are grasped by the fingers, retracted from the forming area, carried to a distant discharge location and released thereat.

2 Claims, 9 Drawing Figures

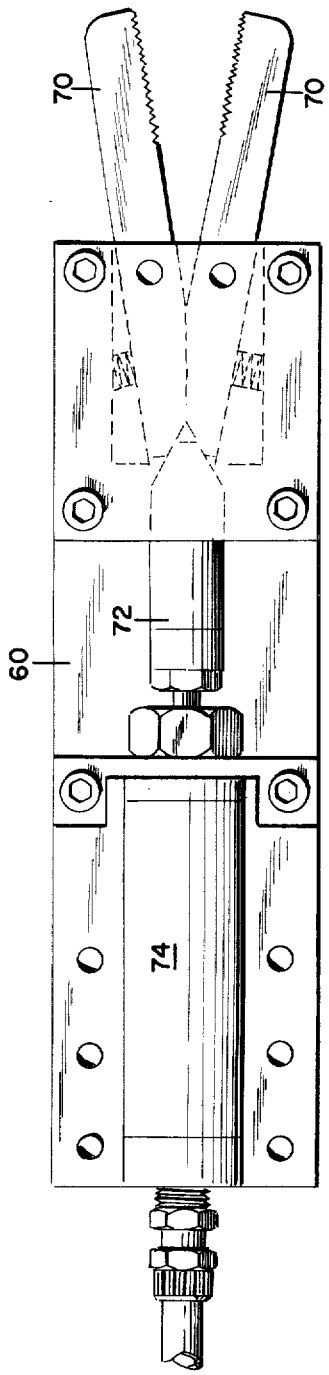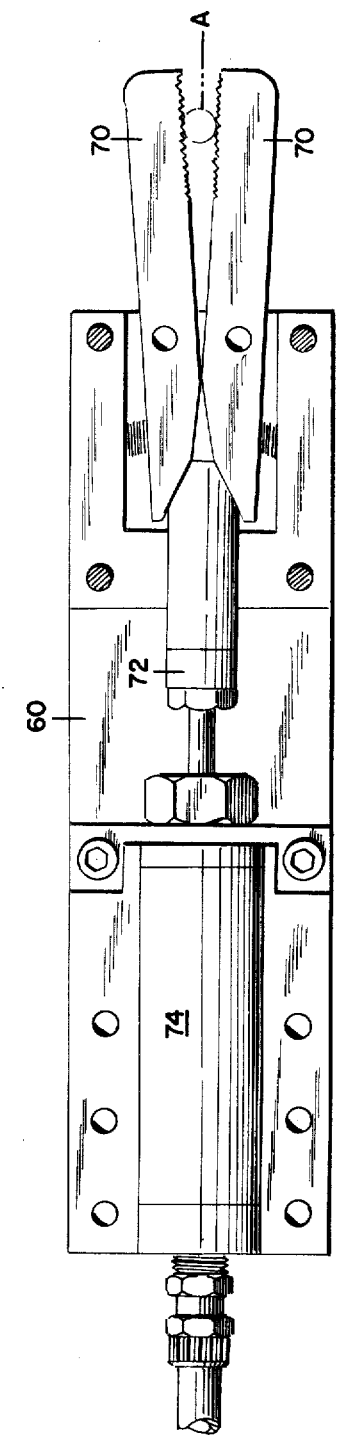

ARTICLE ENGAGING AND EXTRACTING ARRANGEMENT FOR THE REMOVAL OF MOLDED PIECES FROM A MOLDING MACHINE

BACKGROUND OF THE INVENTION

The invention accommodates to a molding machine of the automatic type wherein a split mold, defining one or more mold cavities, includes a stationary mold half and a movable mold half reciprocable relative thereto between opened and closed positions.

In such a machine, the article or articles molded in an operational cycle are usually discharged from the movable mold portion as the latter moves toward the withdrawn or opened position, normally with the aid of one or more ejector rods or pins projectible into each cavity of the receding mold portion so as to dislodge the respective article or workpiece therefrom. The article then usually falls between the mold portions, usually by now approaching each other during the next following closure stroke, into a suitable receptacle therebelow.

With molding machines operating at ever-increasing speeds, such an ejection system is no longer satisfactory since the released article may not properly clear the path of the reciprocating mold portion. Attempts have been made to provide means for positively removing all the workpieces from the mold in its opened state, thus to prevent them from being crushed between the mold portions and from interferring with mold reclosure. Prior systems, however, could not always be fully synchronized with the mold cycle and, for this reason, were not wholly dependable in their operation. Furthermore, even when articles or workpieces were positively removed, they were generally dropped randomly into a receptacle and had to be handled anew for stacking or packing purposes.

SUMMARY OF THE INVENTION

The general object of this invention is to provide an improved article-removal system which, by being positively coupled with the mold drive, ensures timely separation of each article from the mold and enables unobstructed mold closure on the next following article forming operation.

The invention finds application in a press molding machine having a fixed mold half or platen and a movable mold half or platen movable in a linear horizontal direction relative to the fixed mold half between mold-opened and mold-closed positions, with the fixed and movable mold halves being spaced apart or in direct confrontation respectively. Therewith, the means of the invention are provided for engaging and extracting a molded article or articles from the space between the fixed and movable mold halves following the molding operation and as the mold halves are being first opened for such clearing and second closed for the next following molding operation.

The engaging and extracting means are mounted relative to the machine, normally above and astride the forming area and include an extracting arm mounting a gripping element or cooperating fingers on its free distal end. The opposite end of the extracting arm is fixed to and swingable with and at right angles to and may be movable with and in the plane of a driving or pushing shaft, which shaft is machine mounted so as to extend along a horizontal axis parallel to the path of movement of the movable mold half and so as to be reciprocable in forward and retrograde strokes timed with and responsive to the reciprocating opening-closing cyclic strokes of the movable mold half.

The driving shaft is cam operated so that, as it so reciprocates, it simultaneously rotates, in a first mode, to effect the swinging of the extracting arm into and out of the forming area as the mold halves are changing from one mold closed position to the next subsequent mold closed position and moves horizontally, in a second mode, to transport the so retracted extracting arm to a distant discharge point, and reversely, simultaneously moves horizontally to return the extracting arm to proper location preparatory to the next subsequent rotation wherewith the extracting arm again swings into and out of the forming area. Such cycle is continuously repetitive during machine operation.

As the extracting arm is swung into the forming area in the first mode of movement, it is motivated into an article engaging position whereat the gripping element, which may be pneumatically or hydraulically operated, engages the article and withdraws it therewith as it is swung out of the forming area, also as a part of this first mode of movement.

The swinging movement throughout this first mode is in the form of an arc in a generally single vertical plane from an initial position outwardly of the forming area to a second position within the forming area and to a return position again outwardly of the forming area, all while the driving or pushing shaft and the extracting arm mounted thereon is being simultaneously motivated first in retrograde movement responsive to the mold opening stroke and second in forward movement responsive to the mold closing stroke.

Article retrieval takes place in such a way that the extracting arm is swung along this primary vertical path, and is simultaneously moved along the secondary horizontal path toward and away from a distant discharge point.

And if desired, the part may be moved along a tertiary path to an even more distant discharge point. That is, the first and second modes of movement of the extracting means may be followed by a third mode wherein the extracting means may be rotated in another arc away from the axis of movement of the second mode toward and away from a provided discharge means such as a tray or slide or chute or barrel or degating fixture or profiling machine or other article receiving member.

An object of this invention is to provide an article extracting machine that overcomes the disadvantages in prior article extracting machines. A more particular object is to provide an article extracting machine that is adapted to be mounted on the article forming machine and requires substantially no floor space while performing all tasks expected of an article extracting machine.

Another object is to provide such an article extracting machine having an extractor head that is supported from above and which may be swung in substantially a straight line into and out of the article forming area.

Another object is to provide an article extracting machine that has provision for performing all extracting and related operations in essentially one motion such as article extracting and article depositing.

Yet another object is to provide an improved article extracting machine that is simple but efficient in construction, economical to manufacture, and efficient and economical to use.

3

BRIEF DESCRIPTION OF THE DRAWINGS

FIGS. 8 and 9 are actual size representations of the gripping fingers and actuating means thereof in the fingers open and fingers closed positions respectively.

DESCRIPTION OF THE PREFERRED EMBODIMENTS

Figure 1:
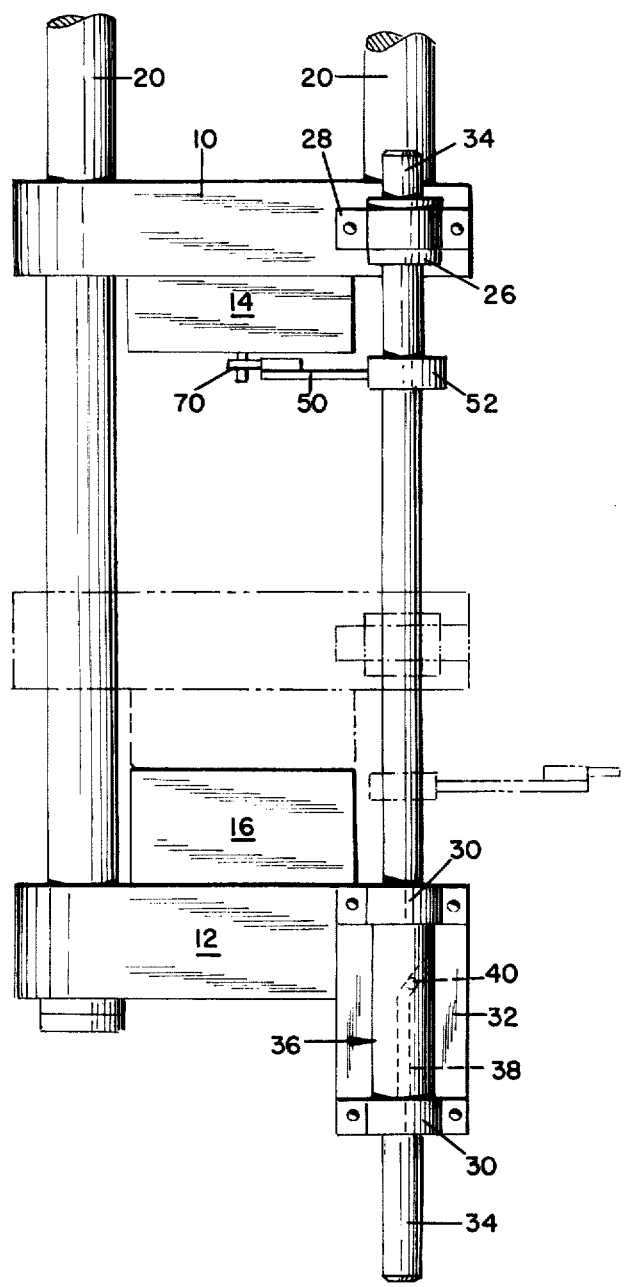
FIG. 1 is a fragmentary diagrammatic view in top plan of a press molding machine according to the present invention.

Referring now to the drawings and initially to FIG. 1, an article engaging and extracting arrangement is shown mounted on an article forming machine which generally includes a movable mold portion or platen 10 cooperant with a fixed mold portion or platen 12, each mounting on the confronting side faces a respective mold 14 and 16. Movable platen 10 is adapted to be moved toward and away from fixed platen 12 in repetitive forming cycles with an article or plurality thereof being formed in the defined cavity or cavities with each forming cycle.

The usual injection piston, cylinder and cylinder housing and other supporting equipment for the charging of the mold with a plastic material are omitted herefrom for purposes of simplification, as is the usual ram driven in reciprocating strokes and mounted rigid with movable mold portion 10, the latter being reciprocable on conventional upper and lower pairs of horizontally-extending tie bars 20, and the fixed platen being stationarily secured to such tie bars. The tie bars will be understood to extend between spaced supporting portions of the machine, again which are not herein shown for purposes of simplification.

A pusher bearing 26 is suitably mounted by a bracket 28 secured as by a weldment or bolting on the top planar surface of movable platen 10. A pair of aligned pusher bearings 30 spaced from each other by a base 32 are mounted as by a weldment or bolting on the top planar surface of fixed platen 12. Pusher bearings 26 and 30 are coaxially aligned as to each other preferentially vertically above and in parallelism with the upper tie bar on the tending side of the machine.

Extendable through the provided openings in pusher bearings 26 and 30 is a pusher or driving shaft 34.

4

Between spaced pusher bearings 30 and 30 is a stationary or fixed cylinder or barrel cam 36 which is sleeved over driving shaft 34 and is fixedly secured to base 32.

Cylinder or barrel cam 36 is provided with a milled cam slot 38 which is constituted by a first involute dwell or cam rise portion and a communicating second elongated horizontally-extending cam straight line portion so as to impart to the driving shaft through a follower 40 fixed to the driving shaft and receivable within the cam slot, when the movable mold half is moving in retrograde mold opening direction, a first driving shaft horizontal straight line motion followed by a second driving shaft combination of horizontal straight line and rotating motions, and when the movable mold half is moving in forward mold closing direction, a first driving shaft combination of horizontal straight line and rotating motions followed by a second driving shaft horizontal straight line motion.

The cam arrangement dictates the retrograde movement followed by the combination retrograde and rotative movements of the article engaging and extracting arrangement in the mold opening mode and the reverse situation in the mold closing mode of the article forming cycle.

A U-shaped extracting arm 50 at one of its ends is fixed to and is swingable on driving shaft 34 by means of an adjustable collar 52 so that, on assembly, the extracting arm may be located precisely with respect to the vertical center line of the sprue of the formed article or articles to be engaged when the extracting arm has swung into the finger engaging position.

The article engaging means comprises a gripper component which is constituted by a pair of oppositely facing gripping fingers 70, 70 which are each pivotally mounted on extracting arm 50 and which may be actuated into closed article gripping position toward each other at their free outboard ends by means of a cylinder operated piston 72 mounted on the extracting arm and operative between article gripping or jaw closed and article releasing or jaw opened positions in timed relation to the machine cycle to which it is connected by the usual means, not shown in FIG. 1.

Figure 2:
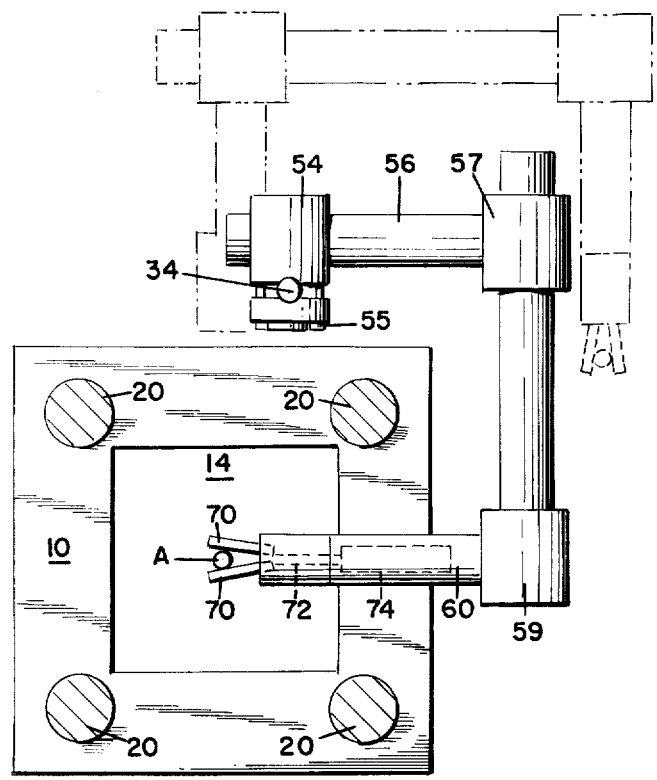
FIG. 2 is a simplified diagrammatic view in side elevation looking toward the working face of the movable mold and platen and showing the gripping component in a generally horizontal mode of article gripping position.

The arrangement of extracting arm 50 may take a first form or side configuration, as shown in FIG. 2, wherein the said arm swings inwardly from the side of the machine toward article A and is shown as being constituted by the adjustable collar in the form of a two part gripping clamp 54 with each part thereof disposed on opposite sides of driving rod 34 and clamped thereto by the usual clamping bolts 55, which clamp 54 adjustably mounts a horizontally-extending first arm part 56 having a free end carrying an elbow 57 from which adjustably extends, at right angles to arm part 56, a second arm part 58 having a free end carrying an elbow 59 from which adjustably extends a third arm part 60 which pivotally mounts fingers 70, 70 at the free end thereof, which fingers are pivotally motivated in opposite directions between jaw closed and jaw opened positions, in FIGS. 9 and 8 respectively, in response to a power stroke of the piston 72 extendable from a cylinder 74 by hydraulic or pneumatic operation.

The gripping fingers, in most cases, will have to be adjustable and formed in a different way for each molding operation. The details thereof are only schematically indicated in the drawing.

Figure 3:
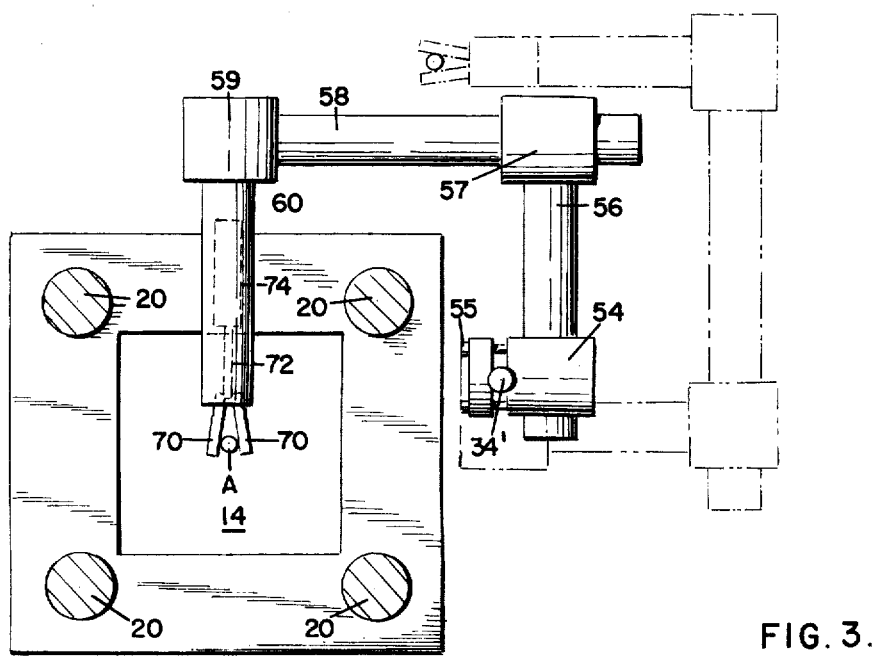
FIG. 3 is a view similar to FIG. 3 but showing the gripping component in a generally vertical mode of article gripping position.
Figure 4:
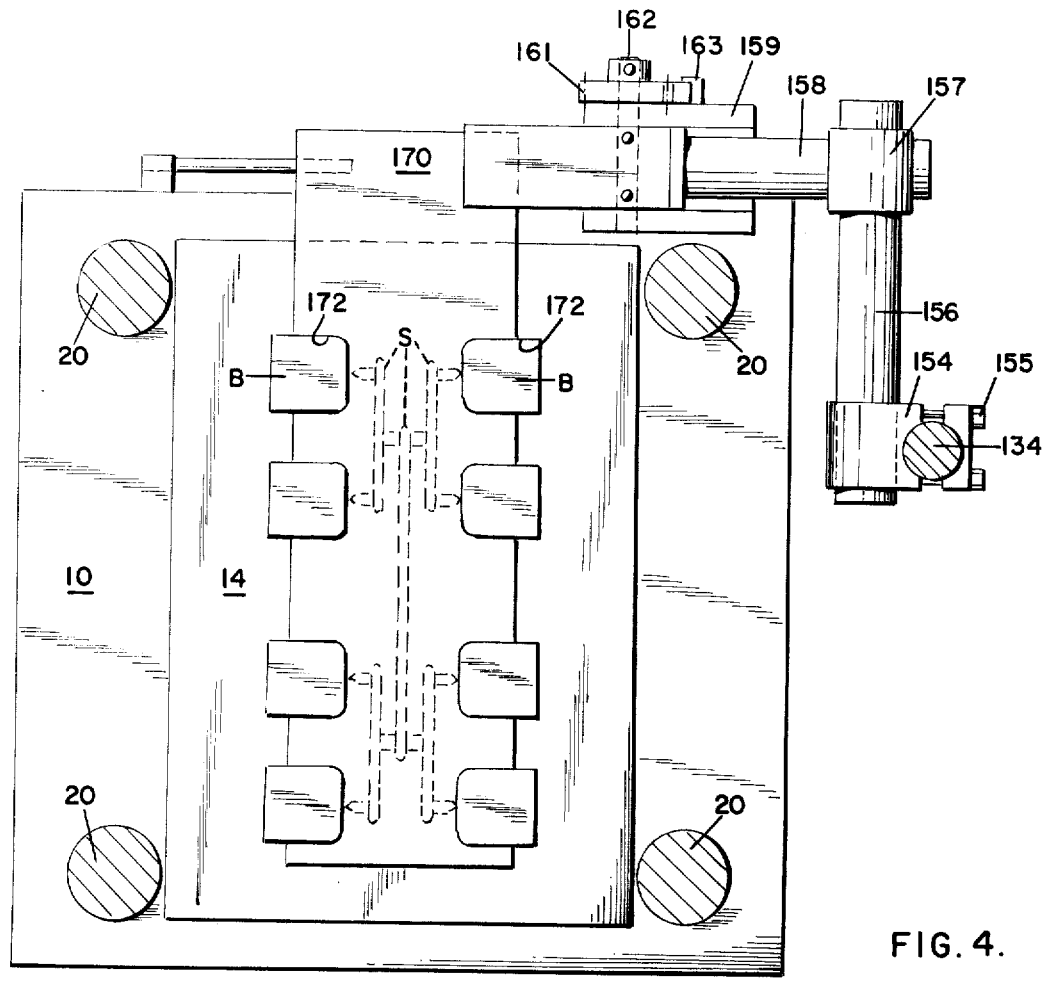
FIG. 4 is a view in side elevation of a first modified form of the invention looking toward the working face of the movable mold and platen and showing the gripping component in article gripping position.
Figure 5:
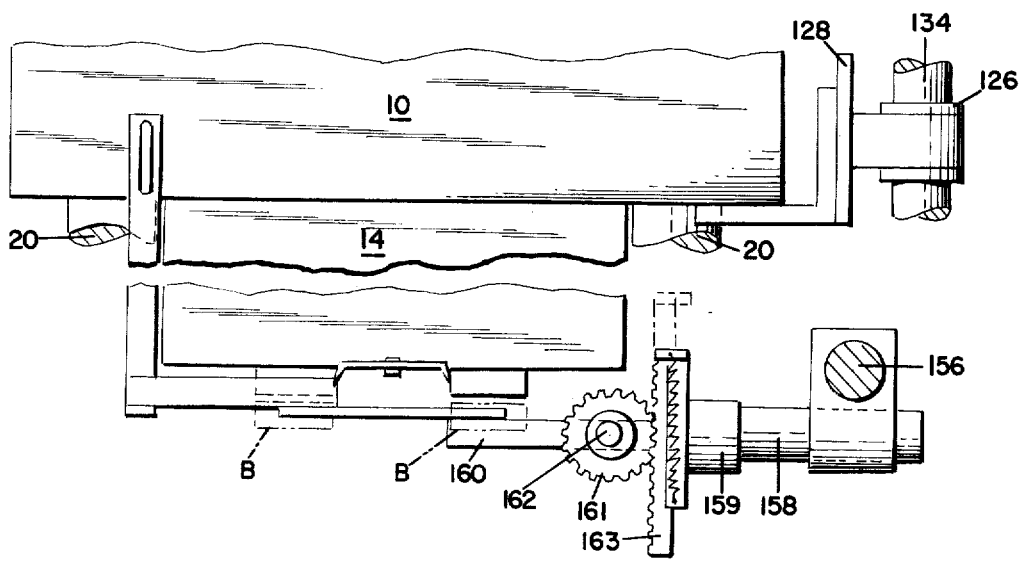
FIG. 5 is a fragmentary broken view in top plan of the FIG. 4 arrangement.

The arrangement of extracting arm 50 may take a second form or top configuration as shown in FIG. 3 wherein the said arm swings inwardly from the top of the machine toward article A and is shown as being constituted by the same components but arranged differently as to each other in view of the disposition of the driving shaft 34' at the side of the machine in a horizontal plane substantially intermediate the horizontal planes of the upper and lower pairs of tie rods 20, 20, such an arrangement conceivably better serving the needs of the user, the dimensions of the formed articles, the location of the machine within the facility or what have you, any of which factors may dictate the advisability of approaching the article from vertically above rather than horizontally astride.

If desired, any one or more of the arms can be connected to the piston of a respective servo-motor for adaptation to be swung in any position so as to locate the gripping fingers at a different situs relative to the machine at the completion of its forward mold closing stroke.

Referring now to FIGS. 4 through 7, a first modified form of article engaging and extracting arrangement is shown as mounted on an article forming machine which generally includes the same movable mold portion or platen 10 mounting a mold 14 and being cooperant with a fixed mold portion or platen and mold, which are not shown. Movable platen 10 is of course adapted to be moved toward and away from the fixed platen in repetitive forming cycles with an article or plurality thereof being formed in the cavity or cavities with each forming cycle and is driven in reciprocating strokes along the conventional horizontally-extending tie bars 20.

As is known, the two opposing molds are provided with suitable cavities or recesses corresponding to the shape of the article or articles B being molded.

Additionally, there is provided a pusher bearing 126 which is journalled in a bracket 128 mounted as by a weldment or bolting on a side of movable platen 10.

A like pusher bearing and bracket arrangement may be provided on a corresponding side of fixed platen so that a driving shaft 134 may be extended therebetween in parallelism with the tie bars, preferentially on the tending side of the machine in a horizontal plane between the horizontal planes defined by the upper and lower pairs of tie bars.

The driving shaft will be understood to be provided with the same arrangement of cylinder or barrel cam, not shown, which is sleeved over the driving shaft, and is provided with the same type of milled cam slot constituted by a first involute dwell or cam rise and a communicating second elongated horizontally-extending cam straight line portion so as to impart to the driving shaft through a follower fixed to the driving shaft and receivable within the cam slot, when the movable mold half is moving in retrograde mold opening direction, a first driving shaft horizontal straight line motion followed by a second driving shaft combination of horizontal straight line and rotating motions, and when the movable mold half is moving in forward mold closing direction, a first driving shaft combination of horizontal straight line and rotating motions followed by a second driving shaft horizontal straight line motion.

A U-shaped extracting arm 150 at one of its ends is fixed to and is swingable on driving shaft 134 by means of an adjustable collar 152 so that on assembly the extracting arm may be located precisely with respect to the center line of the sprue of the formed article or articles to be extracted as the article engaging movement is reached.

The extracting arm arrangement, as shown, takes a top configuration, similar to the FIG. 3 disclosure, when the said arm swings inwardly from the top of the machine toward the articles B and is shown as being constituted by an adjustable collar in the form of a two part gripping clamp 154 with each part thereof disposed on opposite sides of the driving rod and clamped thereto by the usual clamping bolts 155, which clamp 154 also adjustably mounts a vertically extending first arm part 156 having a free end carrying an elbow 157 from which adjustably extends, at right angles to arm part 156 a second part 158 having a free end which supports a pair of wrists 159 fixed thereto at diametrical opposite sides thereof and between which a jaw member 160 is stationarily secured. At one side of the jaw member, a gear 161 is rotatably mounted by means of a pin 162 extendable through the jaw member 160 and opposite wrists 159.

Gear 161 meshes with a gear rack 163 slidably mounted on the adjacent wrist 159 of the pair thereof.

The outer free end of jaw member 160 mounts a frame 170 provided with pockets 172 each arranged to nestably receive one of the formed articles B being formed. The frame shown is provided with 8 pockets so as to receive 8 of the articles B which are interconnected as by sprues S.

Figure 6:
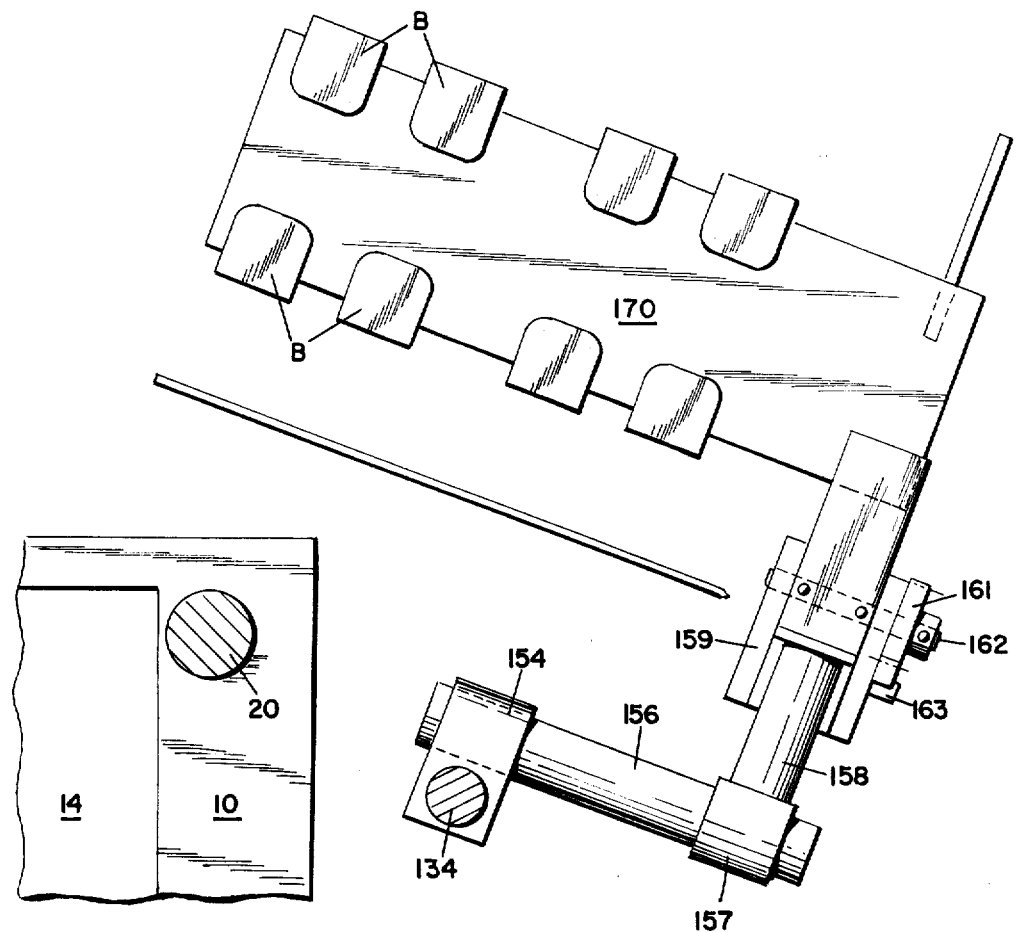
FIG. 6 is a fragmentary broken view in side elevation of the FIG. 4 first modified form at the completion of its vertical stroke (first mode) outwardly of the molding area preparatory to further movement forwardly in a horizontal direction responsive to the continued unidirectional movement of the driving shaft.
Figure 7:
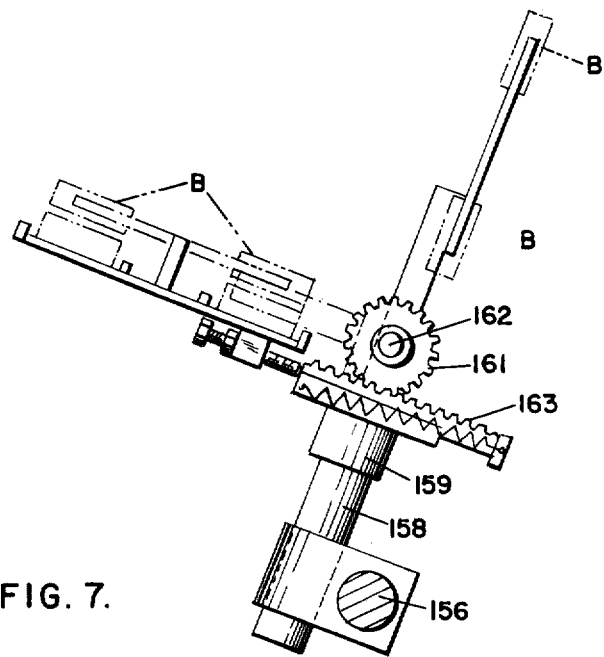
FIG. 7 is a fragmentary view in end elevation of the FIG. 6 arrangement taken from the end (at the right in FIG. 6)

The extracting arm is moved rearwardly as the molds are first being moved in mold opening direction and is then, as the arm moves further rearwardly, moved in an arc so as to sway frame 170 first into the molding area where it embraces the articles B and second out of the molding area carrying the articles B therewith to the FIG. 6 position whereat frame 170 is swung outwardly of the area between the molds and mold platens.

As before explained, when the movable mold half is moving in retrograde mold opening direction, the cam arrangement ensures a first driving shaft horizontal straight line motion, and then a second driving shaft combination of horizontal straight line and rotating motions. Now with the parts in the FIG. 6 position, the movable mold half moves in forward mold closing direction to allow a first driving shaft combination of horizontal straight line and rotating motions, and a second driving shaft horizontal straight line motion.

As the driving shaft moves forwardly, carrying the extracting arm therewith, it is moved until the follower approaches the extreme in its stroke, by which movement the gear rack has been brought into contact with the side wall of an inclined tray like arrangement so as to preclude further movement of the gear rack. So stopped and with the driving rod continuing its forward mold closing stroke, the gear is caused to continue in its forward movement therewith and as it so moves forwardly, it also rotates by virtue of its meshing relationship with the gear rack. The rotative movement of the gear induces, in its train, a pivoting movement of the tray 170 so that it is moved to a FIG. 7 position, approximately 90° from the FIG. 6 position, whereat it releases the articles B into a suitable tray or other discharge means.

In FIG. 8 is shown an article forming machine which generally includes a movable mold platen 210 cooperant with a fixed mold platen 212, each mounting on the confronting side faces a respective mold 214 and 216. Movable platen 210 is adapted to be moved toward and away from fixed platen 212 in repetitive forming cycles.

A pusher bearing 226 is mounted by a bracket 228 on the top planar surface of movable platen 210. Other pusher bearings 230 spaced from each other as by a base 232 is mounted as by a weldment or bolting on the top planar surface of fixed platen 212. Pusher bearings 226 and 230 are aligned as to each other, are located vertically above and in parallelism with the usual tie bars and accommodate a driving shaft 234 extendable therewith.

Between spaced pusher bearings 230 and 230 is a stationary or fixed cylinder or barrel cam 236 which is sleeved over the driving shaft and is fixedly secured to the base which barrel cam is provided with a milled cam slot 240 formed to give a horizontal movement and a simultaneous rotative movement to the driving shaft. When the movable mold half is moving in retrograde mold opening direction, the driving shaft moves in a horizontal straight line motion and also in a rotary motion and when the movable mold half is moving in forward mold closing direction, the driving shaft moves in a horizontal straight line motion and also in a rotary motion.

The cam arrangement allows the combination retrograde and rotative movement in the mold opening mode and the reverse situation in the mold closing mode of the article forming cycle.

An extracting arm 250 is fixed to and is swingable on driving shaft 234.

Stops 260 may be stationarily secured to the driving shaft 234 on opposite sides of the cam, if desired.

I claim:
1. An article engaging and extracting arrangement for the removal of molded pieces from a molding machine and the deposit thereof at a point apart from the molding machine, the combination of:
 a rotatable and reciprocable driving shaft mounted on the molding machine for retrograde movement with the movable mold in a mold opening direction and for forward movement with the movable mold in a mold closing direction, a cam means fixed on the molding machine for generating a horizontal and rotational movement of the driving shaft responsively to mold opening and mold closing strokes, an extracting arm mounted on and movable with the driving shaft so as to be movable rearwardly with the driving shaft and into the space between the molds in the mold opening mode of the machine and out of the space between the molds and forwardly with the driving shaft in mold closing mode of the machine,
 gripping means responsive to penumatic or hydraulic pressure to open and close in scissor like fashion and carried by the extracting arm and arranged to move therewith in timed relation with the mold opening and mold closing cycle strokes of the molding machine,
 a sequencing mechanism responsive to the cyclic movements of the molding machine for moving the jaws of the gripping means into locking engagement with the article within the machine at the first appropriate moment in the mold opening-closing strokes of the molding machine and for moving the jaws into released engagement with the article outside the machine at the second appropriate moment in the mold opening-closing strokes of the molding machine.

2. In a press molding machine including a fixed mold and a horizontally movable mold with means for moving the movable mold in linear horizontal directions between mold opened and mold closed positions and with the molds being spaced apart out of engagement when in the opened positions and being in confronting relationship when in the closed positions forming a mold cavity therebetween, the improvement in means for removing a molded article from the space between the fixed and movable means as the machine is moving from a first mold or closed position to a next following mold closed position comprising:
 a driving shaft mounted relative to and movable with the movable mold,
 a cam means sleeved around the driving shaft and mounted relative to and stationary with the fixed mold,
 the driving shaft being imparted a horizontal linear motion and a rotative motion as the movable mold moves in each of mold opening and mold closing directions,
 an extractor arm fixed to the driving shaft and movable linearly and rotatively therewith,
 gripper means pivotally mounted on the extractor arm for grippingly engaging a molded article as the extractor arm is swung rotatively into the space between the molds in the mold opening mode of cyclic operation and swinging the molded article out of the space between the molds in the mold closing mode of cyclic operation.

\* \* \* \* \*